United States Patent [19]

Muramoto et al.

[11] 4,323,283
[45] Apr. 6, 1982

[54] TRACK ADJUSTING AND RECOIL APPARATUS FOR USE WITH CRAWLER VEHICLES

[75] Inventors: Ei-ichi Muramoto, Hirakata; Motomu Matsui, Ibaragi, both of Japan

[73] Assignee: Kabushiki Kaisha Komatsu Seisakusho, Tokyo, Japan

[21] Appl. No.: 181,390

[22] Filed: Aug. 22, 1980

[30] Foreign Application Priority Data

Aug. 29, 1979 [JP] Japan .......................... 54/117789[U]

[51] Int. Cl.³ ............................................ B62D 55/30
[52] U.S. Cl. ...................................... 305/10; 267/8 R
[58] Field of Search ..................... 180/9.2 R, 9.5, 9.52, 180/9.54, 9.56; 305/10; 267/8 R; 188/311, 313

[56] References Cited

U.S. PATENT DOCUMENTS

| | | | |
|---|---|---|---|
| 3,692,368 | 9/1972 | Alexander | 305/10 |
| 3,765,730 | 10/1973 | Ishida | 305/10 |
| 3,901,563 | 8/1975 | Day | 305/10 |
| 4,223,878 | 9/1980 | Isaia | 305/10 |

FOREIGN PATENT DOCUMENTS 978244 11/1975 Canada .................................. 305/10

Primary Examiner—Joseph F. Peters, Jr.
Assistant Examiner—Randall A. Schrecengost
Attorney, Agent, or Firm—Armstrong, Nikaido, Marmelstein & Kubovcik

[57] ABSTRACT

A hydromechanical track adjusting and recoil apparatus for use with crawler vehicles and the like. The apparatus automatically adjusts the tension in the track of the vehicle by means of momentary mechanical recoil and hydraulic damper for preventing breaking of an endless track chain and associated elements. The track tension is maintained by adjustment of an idler wheel which is connected to one end of the adjusting and recoil apparatus by the interposition of a reciprocably mounted bearing member for rotatably supporting the idler. The other end of the adjusting and recoil apparatus is fixedly connected to a track frame. The apparatus utilizes recoil springs for accumulating transient force energy and automatically returning the apparatus to the original responsive operating condition in cooperation with a hydraulic damper device.

5 Claims, 2 Drawing Figures

TRACK ADJUSTING AND RECOIL APPARATUS FOR USE WITH CRAWLER VEHICLES

BACKGROUND OF THE INVENTION

1. Field of the Invention:

This invention relates to a track adjusting and recoil apparatus for use with crawler vehicles or the like.

2. Description of the Prior Art:

There has heretofore been employed an idler buffer apparatus of the kind specified, which comprises a track frame including a supporting member carrying an idler rotatably, said supporting member being mounted to move freely in the longitudinal direction, recoil springs disposed between said supporting member and the track frame, the arrangement being made such that when an external force is applied to the track wound around the idler, the latter can move in such a direction as to take up or relax the external force, and a hydraulic cylinder adapted to make fine adjustments of the length between the supporting member and the recoil springs.

The above-mentioned prior art apparatus is, however, disadvantageous in that the formation of track frame in light-weight and compact construction requires employment of small-sized recoil springs and therefore there occurs the necessity of providing means for supplementing the reduced biasing forces of the recoil springs.

SUMMARY OF THE INVENTION

The present invention has been devised in view of the foregoing circumstances, and has for its object to provide a track adjusting and recoil apparatus for use with crawler vehicles or the like wherein small-sized recoil springs can be employed even in large-sized tractors, and the length of an idler cushion stroke l can always be kept constant thereby enabling a stabilized buffer action to be obtained by the fluid under pressure, and also the positioning of the front and rear pistons during assembly can be made easily, and further the amount of the fluid to be supplied into the first and second chambers, respectively, can always be kept constant. In addition, when the outer force applied to the idler wheel is removed, all of the operative elements of the recoiler apparatus can be immediately restored to the original responsive operating condition.

BRIEF DESCRIPTION OF THE DRAWINGS

Other objects, features and advantages of the invention will be apparent from the following description taken in connection with the accompanying drawings in which.

DETAILED DESCRIPTION OF THE PREFERRED EMBODIMENT

Figure 1:
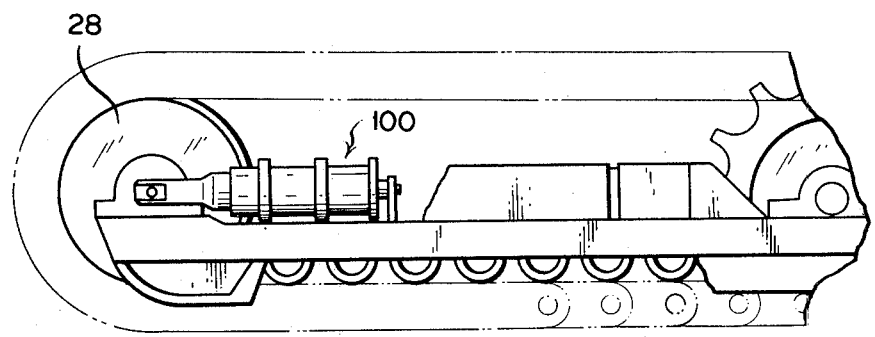
FIG. 1 is a fragmentary schematic side elevation of a crawler vehicle undercarriage provided with a track adjusting and recoil apparatus embodying the present invention.

A track adjusting and recoil apparatus 100 of the present invention will now be described in detail by way of example only with reference to the accompanying drawings.

In the drawing, reference numeral 1 denotes a spring box in which is inserted a cylindrical spring unit 30 which comprises recoil springs 4 and 5 carried therein by spring retainer seats 2 and 3 and which is previously assembled by a bolt 6 extending therethrough.

Figure 2:
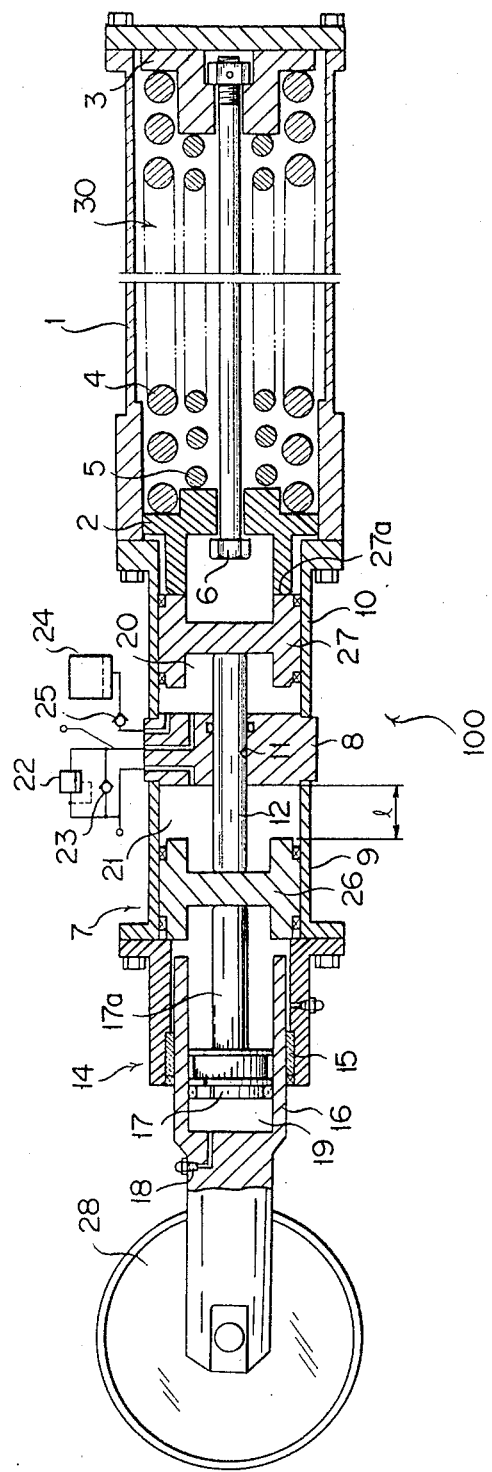
FIG. 2 is an enlarged fragmentary vertical section of one embodiment of the track adjusting and recoil apparatus of the present invention.

In FIG. 2, reference numeral 7 indicates a piston-cylinder assembly which comprises a front cylinder 9 and a rear cylinder 10 both of which are fixedly secured to a boss 8 at the front and rear ends thereof. Formed in the central part of the boss 8 is a hole 11 through which a rod 12 passes slidably.

Fixedly secured to the front end of the spring box 1 is the rear cylinder 10 of the piston-cylinder assembly 7.

A front piston 26 is slidably inserted within the front cylinder 9 of the piston-cylinder assembly 7, whilst a rear piston 27 is slidably disposed within the rear cylinder 10 thereof.

Fixedly secured to the front end of the front cylinder 9 is a cylindrical cover 14 having a proximal end surface against which one end face of the front piston 26 abuts. The rear piston 27 abuts through the rod 12 against the other end face of the front piston 26, and also abuts at the rear end face 27a thereof against the spring retainer seat 2.

A bushing 15 is fitted in the above-mentioned cover 14.

In the drawing, reference numeral 16 denotes an endless track adjusting and recoil cylinder carrying an idler rotatably at one end thereof. The track adjusting and recoil cylinder 16 is inserted through the bushing 15 into the cylindrical cover 14. Slidably mounted within the track adjusting and recoil cylinder 16 is an adjuster piston 17 having a rod 17a which is allowed to bear against the aforementioned one side of the front piston 26 by the action of the grease fed under pressure from an inlet or impregnation port 18 into a third chamber 19.

The cylinder structure 7 includes hydraulic fluid or oil filled first and second chambers 20 and 21 which are allowed to communicate with each other through a relief valve 22 and a check valve 23 disposed in parallel therewith. Further, the first chamber 20 is connected through a check valve 25 to a hydraulic fluid or oil reservoir 24.

The operation of the apparatus of the present invention will now be described below.

The length of the rod 12 is determined to ensure that the front piston 26 reaches its leftward stroke end when the recoil springs 4 and 5 are extended fully as shown. Reference character l denotes an idler cushion stroke. The external force applied through the endless track on the idler 28 is exerted on the track adjusting and recoil cylinder 16, the grease filled therein, the adjuster piston 17 and the front piston 26. The external force thus applied will balance statically with the recoil springs 4 and 5 through the rod 12, the rear piston 27 and the spring retainer seat 2. When an excessive impact force is applied to the endless track of a crawler vehicle or the like during running, such impact force absorbed by the recoil springs 4 and 5 and further dumped by the relief valve 22 so as to act a cushioning effect. When the excessive external force has been removed, the recoil springs 4 and 5 will extend fully by their own resiliency thereby stretching the track and at the same time permitting the fluid flow from the first chamber 20 into the second chamber 21 through the check valve 23 so as to return the track to its normal operating or stretched condition.

The track adjusting and recoil apparatus 100 of the present invention is constructed as mentioned in detail hereinabove, and characterized by comprising a spring box 1 in which is inserted a cylindrical spring unit 30 which comprises recoil springs 4 and 5 carried therein by spring retainer seats 2 and 3 and which is previously built up by extending a bolt 6 therethrough a front cylinder 9 and a rear cylinder 10 each being fixedly secured to a boss 8 at the front and rear ends thereof to form a piston-cylinder assembly 7, one end of said piston-cylinder assembly 7 being connected to the inner end of said spring box 1, a front piston 26 slidably mounted within the front cylinder 9 of the piston-cylinder assembly 7 and a rear piston 27 slidably mounted within the rear cylinder 10 thereof, a rod 12 extending through the boss 8 of the piston-cylinder assembly 7 and adapted to transmit the movement of either one of the front and rear pistons 26 and 27 to the other, said rear piston 27 being adapted to abut against the spring retainer seat 2 of the spring cylinder 30 by the action of the fluid pressure, a cylindrical cover 14 fitted to the front cylinder 9 for restricting the movement of the front piston 26, and a track adjusting and recoil cylinder 16 carrying an idler 28 rotatably at the outer end thereof and adapted to be inserted in the front cylinder 9 and accommodate an adjuster piston 17 slidably mounted therein, said adjuster piston 17 being adapted, when urged by the pressurized grease filled in a third chamber 19, to bear against the front piston 26 thereby permitting the first chamber 20 and the second chamber 21 of the piston-cylinder assembly 7 to communicate with each other through a relief valve 22 and a check valve 23 located in parallel therewith.

Therefore, it is possible to employ a small-sized spring in the spring box, and also the length of the idler cushion stroke l which the front piston 26 is allowed to abut against the cover 14 can be always kept constant thereby enabling a stabilized buffer action to be achieved by the hydraulic fluid pressure. Accordingly, the amount of the hydraulic fluid filled in the first and second chambers 20 and 21, respectively, can be kept constant. In addition, when the outer force applied to the idler wheel is removed, all of the operative elements of the recoil apparatus can be immediately restored to the original responsive operating condition.

It is to be understood that the foregoing description is merely illustrative of a preferred embodiment of the present invention, and that the scope of the invention is not to be limited thereto, but is to be determined by the scope of the appended claim.

What is claimed is:
1. A track adjusting and recoil apparatus comprising:
(a) a cylinder having wall means defining first and second chambers;
(b) a first piston reciprocably accommodated within said first chamber and defining a first sealed chamber between said first piston and said wall means;
(c) a second piston reciprocably accommodated within said second chamber for movement by a track idler means and defining a second sealed chamber between said second piston and said wall means;
(d) a rod disposed through said wall means between said first and second pistons in a manner such that said rod always comes into contact with both the pistons;
(e) means for biasing said first piston inwardly;
(f) a cylindrical cover fitted to the distal end of said cylinder so as to restrict the reciprocal movement of the second piston;
(g) a track tension adjusting means for maintaining a predetermined track tension by adjustment of an idler wheel connected to the distal end thereof, said track tension adjusting means including a cylindrical member reciprocably inserted into said cylindrical cover and a piston defining an adjusting pressure chamber between said cylindrical member and said piston, said piston being provided on the opposite side of said pressure chamber with an integral piston rod abutting against said second piston on the opposite side of said rod; and
(h) passage means for allowing the fluid communication between said first and second sealed chambers through a relief valve and a check valve provided in said passage means with parallel relation to said relief valve.

2. A track adjusting and recoil apparatus as claimed in claim 1, wherein said means for biasing said first piston comprises a recoil spring unit consisting of at least one recoil spring, a pair of spring retainers provided at the opposite ends of said recoil spring and a bolt connected between said spring retainers one of which abuts against said first piston on the opposite side of said rod.

3. A track adjusting and recoil apparatus as claimed in claim 1, said adjusting pressure chamber of said track tension adjusting means is allowed to compressively squeeze grease therewith in so as to select and maintain a desired track tension.

4. A track adjusting and recoil apparatus as claimed in claim 1, further comprising a hydraulic fluid reservoir connecting through a check valve to either said first or second sealed chamber so as to supply hydraulic fluid into said sealed chamber.

5. A track adjusting and recoil apparatus as claimed in claim 1, further comprising a cylindrical bushing inserted between said cylindrical cover and said cylindrical member of said track tension adjusting means.

* * * * *